US009392178B2

(12) United States Patent  
Thurairatnam

(10) Patent No.: US 9,392,178 B2  
(45) Date of Patent: Jul. 12, 2016

(54) ORGANIZATIONAL VISUAL MEDIA CAPTURE

(71) Applicant: Indran Rehan Thurairatnam, Henderson, NV (US)

(72) Inventor: Indran Rehan Thurairatnam, Henderson, NV (US)

( * ) Notice: Subject to any disclaimer, the term of this patent is extended or adjusted under 35 U.S.C. 154(b) by 0 days.

(21) Appl. No.: 14/715,596

(22) Filed: May 19, 2015

(65) Prior Publication Data

US 2015/0334307 A1    Nov. 19, 2015

Related U.S. Application Data

(60) Provisional application No. 62/000,239, filed on May 19, 2014.

(51) Int. Cl.
*H04N 5/232* (2006.01)
*H04N 1/00* (2006.01)
(Continued)

(52) U.S. Cl.
CPC ............ *H04N 5/23293* (2013.01); *G06F 3/016* (2013.01); *G06F 17/30265* (2013.01);
(Continued)

(58) Field of Classification Search
CPC ............ H04N 1/0048; H04N 1/00411; H04N 1/00413; H04N 1/0044; H04N 1/00442; H04N 1/00445; H04N 1/00448; H04N 1/00458; H04N 1/2125; H04N 1/2129; H04N 5/23216; H04N 5/23222; H04N 5/23229; H04N 5/23293; G06F 3/016; G06F 17/30265; G06F 17/30274
See application file for complete search history.

(56) References Cited

U.S. PATENT DOCUMENTS 6,411,337 B2 * 6/2002 Cove et al. .................... 348/563  
8,428,453 B1    4/2013 Spiegel  
(Continued)

OTHER PUBLICATIONS

Dani Fankhauser, "If Your Photos Are Untidy, There's an App for That," internet magazine Mashable, Apr. 13, 2014, http://mashable.com/2014/04/13/tidy-photo/, Printed from Internet on Apr. 22, 2015.
(Continued)

*Primary Examiner* — Daniel M Pasiewicz

(57) ABSTRACT

An electronic device (100) includes digital image sensors (106) to capture visual media (114), a display (102) to present a visual representation of existing organizational categories and the option to create a new category, and a touch controller (103) to identify haptic contact engagement, haptic contact location and haptic contact release on the display. A visual media capture controller (110) organizes visual media (114) captured by the digital image sensors (106) into new and existing categories by identifying a predetermined number of haptic signals of predetermined type (a "predetermined haptic signal pattern"), generating organizational information based upon information generated by the touch controller (103) regarding the predetermined haptic signal pattern, and recording the organizational information. An advantage of one or more aspects of the invention is that they enhance the ability of the user to use a visual media capture device for visual thinking, which differs qualitatively from uses of visual media capture devices served by current designs known in the art. Another advantage of one or more aspects of the invention is that they facilitate faster and simpler collection of organizational information from the user, on-the-fly, upon visual media capture than methods known in the art. A third advantage of one or more aspects of the invention is that they facilitate more precise organization based upon fleeting thoughts, ideas and emotions that exist at the time of capture allowing for creative and subjective expression.

20 Claims, 4 Drawing Sheets

(51) Int. Cl.
*H04N 1/21* (2006.01)
*G06F 17/30* (2006.01)
*G06F 3/01* (2006.01)

(52) U.S. Cl.
CPC ...... *G06F17/30274* (2013.01); *H04N 1/00411* (2013.01); *H04N 1/00413* (2013.01); *H04N 1/2125* (2013.01); *H04N 1/2129* (2013.01); *H04N 5/23216* (2013.01); *H04N 2201/0084* (2013.01)

(56) References Cited

U.S. PATENT DOCUMENTS

| | | | |
|---|---|---|---|
| 9,046,685 B2* | 6/2015 | Nakada | |
| 2005/0086611 A1* | 4/2005 | Takabe et al. | 715/823 |
| 2007/0293265 A1* | 12/2007 | Fei et al. | 455/556.1 |
| 2010/0205563 A1* | 8/2010 | Haapsaari et al. | 715/825 |
| 2012/0092509 A1* | 4/2012 | Kim | 348/207.1 |
| 2014/0059497 A1* | 2/2014 | Burckart et al. | 715/854 |

OTHER PUBLICATIONS

Adriana Lee, "With Carousel, Dropbox Wants to Handle All the Photos," internet magazine Readwrite, Apr. 9, 2014, http://readwrite.com/2014/04/09/carousel-dropbox-photo-sharing, Printed from Internet on Apr. 22, 2015.

Sarah Perez, "Digital Scrapbook Ember Makes Its Way to iOS, With iCloud Sync, Smart Photo Collections & More," internet magazine TechCrunch, Dec. 3, 2013, http://techcrunch.com/2013/12/03/digital-scrapbook-ember-makes-its-way-to-ios-with-icloud-sync-smart-photo-collections-more/, Printed from Internet on Apr. 22, 2015.

"Visual Thinking," Wikipedia article, May 18, 2014, http://en.wikipedia.org/wiki/Visual_thinking, Printed from Internet on May 18, 2015.

Steven Pinker, "The Blank Slate: The Modern Denial of Human Nature," 2002, pp. 87-91, 100, 179-183, 186-192, 346-352, Penguin: New York.

* cited by examiner

ORGANIZATIONAL VISUAL MEDIA CAPTURE

CROSS-REFERENCED APPLICATIONS

This application claims the benefit of U.S. Provisional Application No. 62/000,239, filed May 19, 2015, which is incorporated by reference.

This application references the single mode visual media capture device disclosed in U.S. Pat. No. 8,428,453 granted Apr. 23, 2013, which is incorporated by reference.

FIELD OF THE INVENTION

This invention relates generally to capturing visual media, such as photographs and videos. More particularly, this invention relates to capturing organizational information as a part of a visual media capture.

BACKGROUND

Existing visual media capture devices implement a single physical or virtual button for initiating capture upon a press of the button and terminating capture automatically, upon release of the button, or upon another press of the button. Automated data collection at the time of capture allows for a crude organization of captured media based upon objective characteristics such as time or location of capture. The organization of large quantities of captured visual media is a longstanding problem. This problem has worsened with the increasing ease of use and availability of visual media capture devices, such as smartphones, with large amounts of data storage capacity. I have found it a major shortcoming that existing designs do not provide any adequate mechanism for creative or subjective categorization responsive to the captured media. Creative or subjective categorization differs qualitatively from uses of visual media capture served by current designs; a design that provided for such would be of great utility to visual thinkers including creatives working in visual industries.

Some digital visual media capture devices have organizational options that do not alter the capture design. For example, some digital visual media capture devices allow the user to manage folders on the digital storage medium and select one as a destination for subsequently captured visual media. Folder management and selection is entirely distinct from the capture operation by design: it requires navigating the settings menus of the camera to either create a new folder or select an existing folder. To create a new folder the user is prompted to either manually input a name for the new folder or to confirm the default naming convention of the device. This design requires that a user specify the desired organizational category (colloquially an "album") prior to capture. Specifying the desired organizational category for the result of a capture prior to capture is problematic in that it requires the user to envision the result of the capture beforehand. Additionally, setting the desired organizational category prior to beginning a capture operation delays the user from reaching his/her proximate goal of capturing visual media.

Other digital visual media capture devices have organizational options that alter the capture design by allowing folder assignment or creation after capture, but still require that a user either manually input a name for the new folder or to confirm the default naming convention of the device. Visual media capture devices are capable of implementing applications ("apps") that modify the functionality of the device implementing the app for a niche specific purpose. For example, some apps are tailored to create posts on social media network platforms used for sharing visual media, text, links and more. A device running an app for a niche specific purpose may implement organizational features ancillary to a purpose distinct from visual media capture, such as making a social media post. In each of these devices, creating a new categorization entails requesting that the user provide information, such as inputting a title for the categorization, which requires significant abstract reasoning to anticipate what title would be appropriate for a set where the user has only one member so far, severely limiting the creative utility of the feature and the ability of the feature to reflect fluid subjective judgments. This solicitation of text information from user is preserved in order to facilitate organizational structures and display methods known presently in the art. Using these organizational features requires significant time and mental effort, limiting their practical value and explaining why these designs have not been widely adopted for visual media capture devices where visual media capture is not ancillary to a distinct purpose.

In sum, organization of large quantities of captured visual media is a longstanding problem with no existing visual media capture device providing a solution that allows organization along any subjective or objective parameter in a timely fashion that requires little mental and physical effort. Moreover, as it has not been previously recognized as a shortcoming of visual media capture devices, no existing device attempts to provide for fluidly creative and subjective organization responsive to the captured media akin to thinking visually. While such a use of a visual media capture device is qualitatively different from uses served by current designs, a visual media capture device that provides for creative and subjective organization with ease would be of great utility to visual thinkers including creatives working in visual industries.

SUMMARY

An electronic device includes digital image sensors to capture visual media (such as photographs and/or video), a display to present a visual representation of existing organizational categories (colloquially "albums") and the option to create a new category, and a touch controller to identify haptic contact signals on the display. A visual media capture controller organizes visual media captured by the digital image sensors into new and existing categories by identifying a predetermined number of haptic signals of predetermined type (a "predetermined haptic signal pattern"), generating organizational information based upon information generated by said touch controller regarding the predetermined haptic signal pattern, and recording said organizational information.

In one embodiment, subsequent to receiving signals to begin and then end a media capture operation, the visual media capture controller causes the display to present a visual representation of existing categories as well as a representation of a new, empty category. The visual media capture controller interprets a predetermined haptic signal pattern to assign the captured media to a new or existing category by generating and storing corresponding organizational information.

In one embodiment, the predetermined haptic signal pattern corresponds to the haptic contact and release resulting from a single tap upon a visual representation of either an existing category or a representation of a new category upon the display. An advantage of one or more aspects of the invention is that they enhance the ability of the user to use a visual media capture device for visual thinking, which differs qualitatively from uses of visual media capture devices served by current designs known in the art. Another advantage of one or more aspects of the invention is that they facilitate faster and simpler collection of organizational information from the user, on-the-fly, upon visual media capture than methods known in the art. A third advantage of one or more aspects of the invention is that they facilitate more precise organization based upon fleeting thoughts, ideas and emotions that exist at the time of capture allowing for creative and subjective expression. Other advantages will be apparent from a consideration of the drawings and ensuing description.

BRIEF DESCRIPTION OF THE FIGURES

The invention is more fully appreciated in connection with the following detailed description taken in conjunction with the accompanying drawings, in which.

Like reference numerals refer to corresponding parts throughout the drawings.

Figure 2:
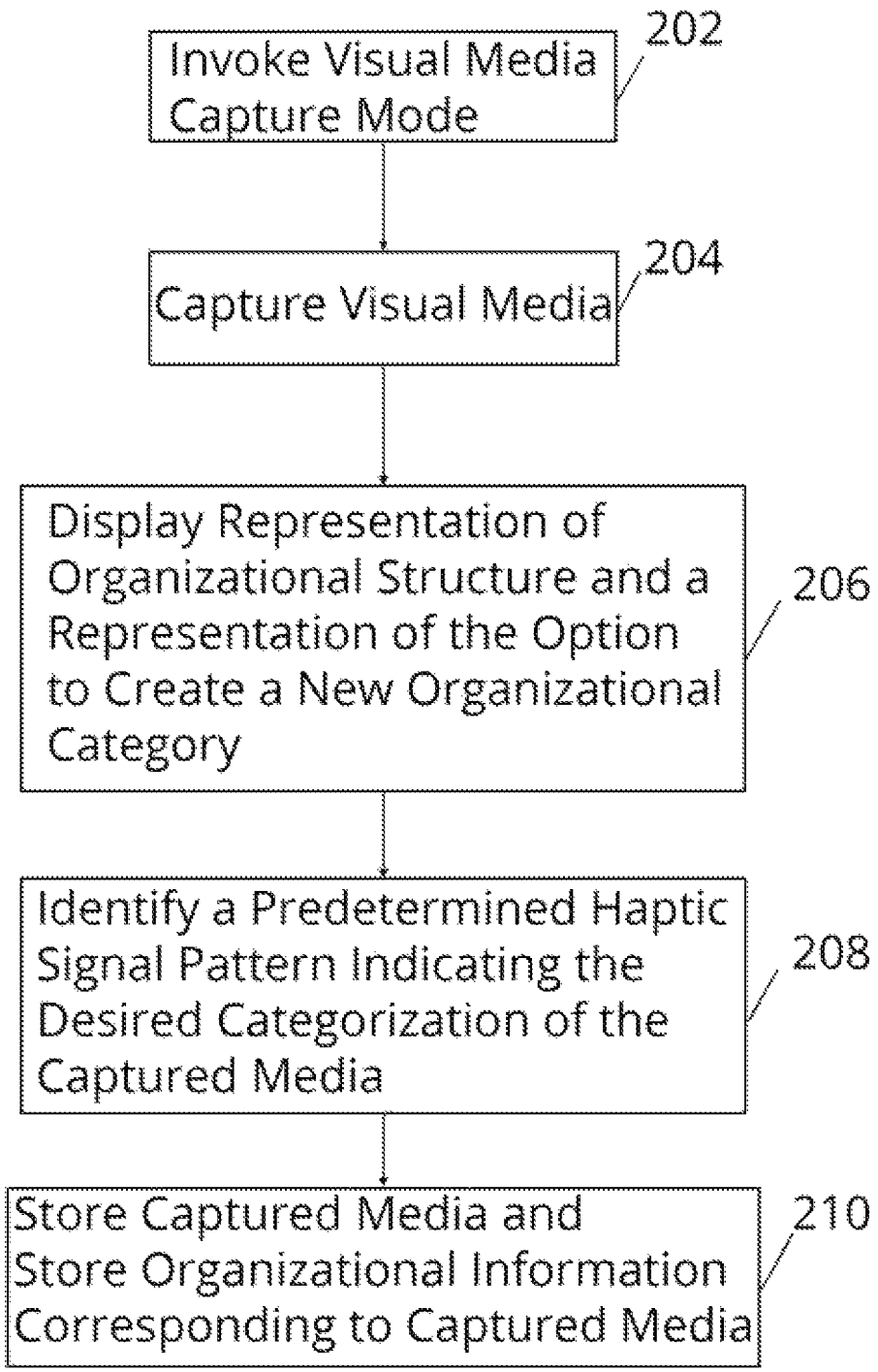
FIG. 2 illustrates processing operations associated with an embodiment of the invention.

REFERENCE NUMERALS 100 visual media capture device
102 display unit
103 touch controller
104 memory/storage unit
106 image sensor unit
108 processing unit
110 visual media capture controller
112 visual media library controller
114 visual media
202 FIG. 2 embodiment usage flowchart step 1
204 FIG. 2 embodiment usage flowchart step 2
206 FIG. 2 embodiment usage flowchart step 3
208 FIG. 2 embodiment usage flowchart step 4
210 FIG. 2 embodiment usage flowchart step 5
302 a carousel visual representation of an organizational structure and the option to create a new organizational category (colloquially an "album")
304 a carousel panel receiving visual focus

DETAILED DESCRIPTION

Figure 1:
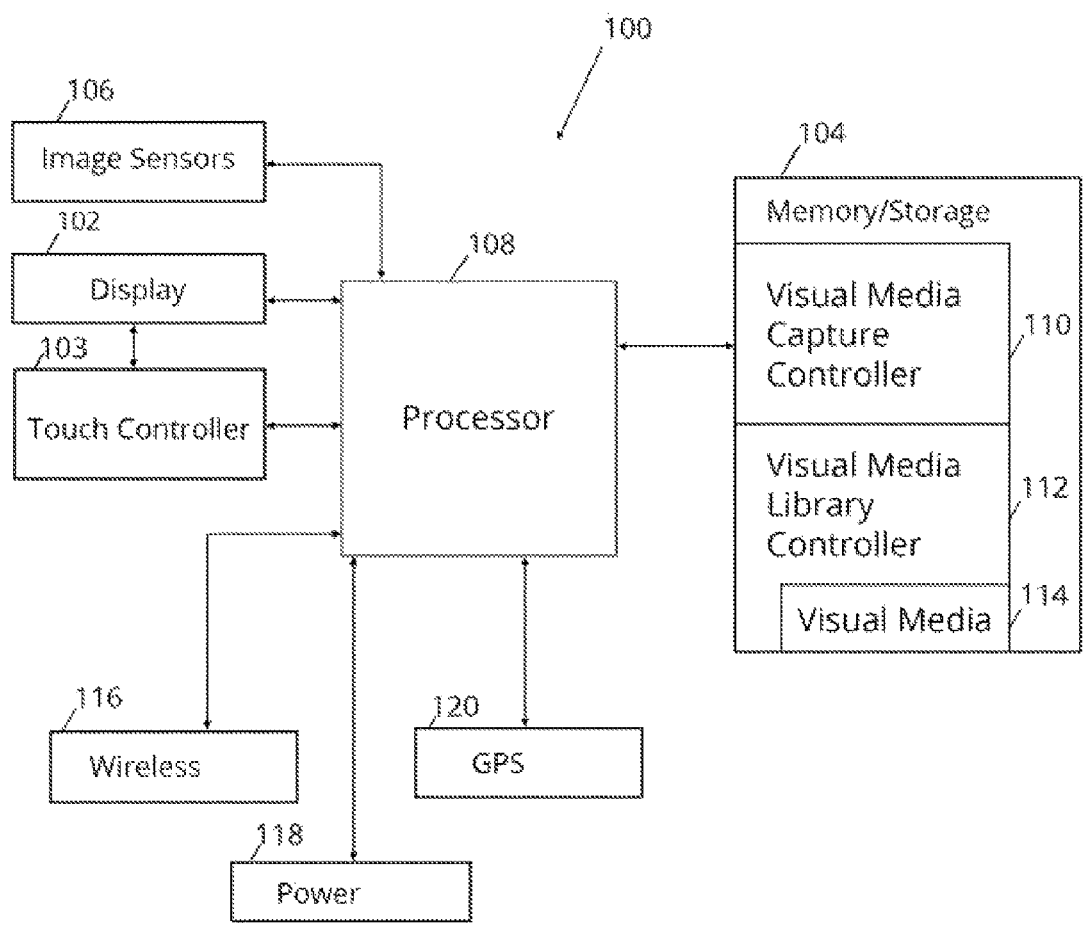
FIG. 1 illustrates components of an electronic device implementing organizational visual media capture in accordance with the invention.

FIG. 1 illustrates a visual media capture device 100, implementing operations of the invention. The visual media capture device 100 may be a digital camera, smartphone or any other digital device with visual media (for example, photographs and/or video) capturing function. In one embodiment the media capture device 100 is a smartphone, which includes a number of functional units such as: a display unit 102, a touch controller 103, a memory/storage unit 104, an image sensor unit 106, a processing unit 108, a visual media capture controller 110, and visual media library controller(s) 112.

The touch controller 103 is responsive to haptic signals applied to the display unit 102 and is also connected to the processing unit 108. The processing unit 108 may be a central processing unit and/or a graphics processing unit, which is/are in communication with the memory/storage unit 104. The memory/storage unit 104 is a combination of flash memory and random access memory. The memory/storage unit 104 stores a visual media capture controller 110 and one or more visual media library controller(s) 112 to implement operations of the invention. The visual media capture controller 110 interacts with the visual media library controller(s) 112, which include(s) executable instructions to store, organize and present visual media 114. The visual media capture controller 110 includes executable instructions for capturing the visual media and for receiving organizational information from the user based upon the processing of haptic signals, as discussed below.

In one embodiment, one of the visual media library controller(s) 112 is a media library controller capable of storing, organizing and presenting visual media without receiving any language-based descriptive information, such as titling information, from the user. The remainder of the visual media library controller(s) 112 may be standard media library controllers known in the art, which require text-based titles for the organizational categories (colloquially "albums"). In another embodiment, for backwards compatibility similar functionality can be achieved using only standard visual media library controller(s) 112, where the visual media capture controller 110 generates titling information to pass to the visual library media controller(s) 112 automatically, without user interaction. The executable instructions contained in the visual capture controller 110 are designed such that the titling information generated thereby meets the validity requirements of the visual library media controller(s) 112 without requiring user input to generate the titling information. In both of said embodiments, the design of the visual media capture controller 110 enables organizing captured media using a predetermined number of contact signals of predetermined type (a "predetermined haptic signal pattern"). While both embodiments share the other advantages described herein, the embodiment automatically generating titling information has the additional advantage of backwards compatibility with legacy systems that require titling information for the organizational categories.

In one embodiment, the predetermined haptic signal pattern identified by the visual media capture controller 110 is the haptic contact and subsequent release signals within a short period of time generated by a single tap (or other predetermined haptic signal patterns used to identify a single tap known in the art) on the display 102. The visual capture controller 110 generates and stores organizational information by analyzing the location of the tap on the display 102 and cross-referencing that location with the state of a visual representation upon the display 102 generated by the visual capture controller 110 of both the organizational structure and the option to create a new organizational category. Using solely a visual media capture controller 110 and visual media library controller(s) 112 known in the art precludes using a predetermined haptic signal pattern to create a new category since input of custom, user-provided language based descriptive information such as titling information for creation of a new category can not be achieved solely via a predetermined haptic signal pattern. Using a touch screen keyboard to input natural language titling information, for example, requires a variable number of haptic contact signals since the number of characters in a title desired by the user can not be known in advance and thus can not be achieved using a predetermined number of haptic signals. Other embodiments include where the predetermined haptic signal pattern is generated by the user by tapping twice, swiping, pinching, etc. upon the display 102. Using exclusively predetermined haptic signal patterns facilitates more rapid and precise collection of organizational information on-the-fly than designs known in the art, which enhances uses of the device for creativity and visual thinking as well as certain more traditional uses of the device.

The visual media capture device 100 may also include other components commonly associated with a smartphone or digital camera or other visual media capture device, such as a wireless communications unit 116, a power control unit 118 and a global positioning system unit 120. While many of the components of FIG. 1 are known in the art, new functionality is achieved through the visual media capture controller 110.

FIG. 2 illustrates processing operations associated with particular embodiments of the visual media capture controller 110. Initially, a visual media capture mode is invoked 200. For example, various smartphone interfaces allow a user to access a camera application presented on the display 102 by tapping an icon representing that application. Doing so invokes a visual media capture mode, activating the visual media capture controller 110.

A visual media capture mode can be invoked in many other ways known in the art. For example, the device may be dedicated to visual media capture, such as with digital camera devices and may enter a visual capture mode automatically upon the device being turned on. One additional example is when an application running on a smartphone device invokes a visual capture mode as part of a larger operation, such as during construction of a social media post.

The visual media capture controller 110 includes executable instructions executed by the processing unit 108 to simultaneously present the user with a live preview of the captured media and a capture interface upon the display unit 102. The image sensor unit 106 transmits to the processing unit 108 information regarding a capture operation, including a live preview of the capture operation and media resulting from the capture operation.

The touch controller 103 detects haptic signals upon the display 102, which cause the visual media capture controller 110 to capture visual media 202. Executable instructions included in the touch controller 103 and executed by the processing unit 108 interpret these haptic signals, which determine parameters of the media capture including when it begins and ends.

The aforementioned capture interface created by the visual media capture controller 110 and executable instructions contained in the touch controller 103 interpreting the haptic signals thereupon can be any of the variations known in the art. In one embodiment, the user taps a visual representation of a camera shutter button upon the display unit 102, generating haptic signals interpreted by the touch controller 103 to indicate the instant that the image sensor unit 106 should capture a photograph. In another embodiment, the user may tap and hold a visual representation of a button to capture a photograph or video alternatively in accordance with the device disclosed in U.S. Pat. No. 8,428,453 granted Apr. 23, 2013.

At some point after the visual media capture, the visual media 114 captured by the image sensor unit 106 is passed to the visual media library controller(s) 112 and stored thereby 208. In one embodiment, the visual media capture controller 110 includes executable instructions to enter a visual media preview mode immediately after a visual media capture (not illustrated in FIG. 2). Consequently, a user can conveniently review recently captured media and/or perform various other actions with the captured media such as editing it, sharing it and various other actions as known presently in the art.

Also after the visual media capture, the visual media capture controller 110 displays a representation of the existing organizational structure and representation of the option to create a new organizational category 204. After the visual media capture, the visual media capture controller 110 transmits executable instructions to the processing unit 108 to retrieve from the one or more visual media library controller(s) 112 the information required to present the existing categories of visual media. The visual media capture controller 110 includes executable instructions executed by the processing unit 108 to display upon the display unit 102 a visual representation of the existing organizational structure stored by the visual media library controller(s) 112 as well as a visual representation of the option to create a new organizational category for storage by the visual media library controller(s) 112.

Figure 3:
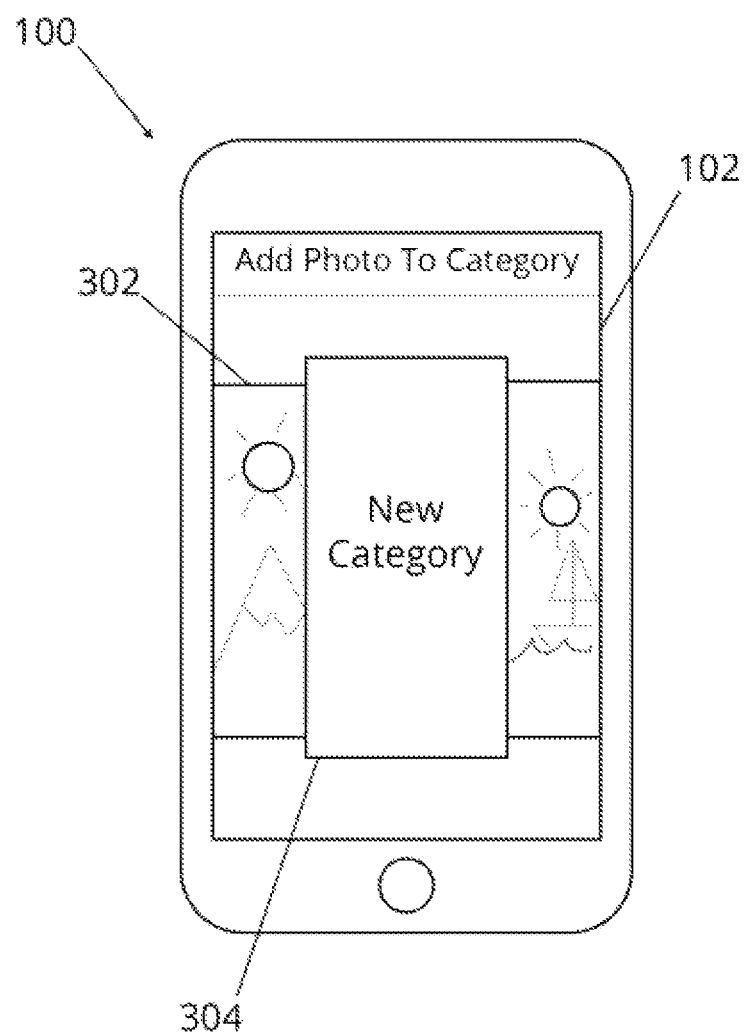
FIG. 3 illustrates the exterior of an electronic device implementing organizational visual media capture in accordance with the invention.

In one embodiment, the visual representation of the organizational structure and the option to create a new organizational category is a two-dimensional representation of a three-dimensional carousel (where a "carousel" is a series of panels which move together, possibly around a rotational axis, and eventually wrap around back to the initial panel simulating a cylindrical arrangement of panels) with simulated axis of rotation oriented parallel to the longer side of the device 302 as illustrated in FIG. 3. In this embodiment, the frontmost panel of the carousel receives more prominent size and placement than the other panels naturally in order to attract visual focus to a single panel at a time 304 as shown in FIG. 3. In the carousel, each panel represents either the option to create a new organizational category or an organizational category. Each panel representing a category contains a visual representation of the category such as one or more photographs already contained within the category. This embodiment enhances the ability of the user to rapidly visually scan the existing organizational structure over the prior art, which expedites selecting an organizational category for the captured media. Additionally, for handheld form factor devices such as certain smartphones, this embodiment enhances the ability of the user to operate the device with only one hand by favoring a natural lateral thumb motion to scroll through the organizational categories. This is a significant advantage over devices displaying organizational categories known in the art, which typically use a flat vertically-scrolling table layout with long text descriptions accompanying small thumbnails representing organizational categories. The vertically-scrolling table layout known in the art favors using a vertical thumb motion to scroll, which is uncomfortable to use during one handed operation of the device.

In said embodiment, the user may touch the display 102 attempting to cause the visual representation of the carousel to rotate, or otherwise move, in order to change the image in the carousel receiving visual focus. Upon the user doing so, the touch controller 103 transmits information regarding said haptic signals to the visual media capture controller 110, which interprets the haptic signals and transmits executable instructions to the processing unit 108. In response to said instructions, the processing unit 108 updates the visual representation upon the display 102 in accordance with the received executable instructions and the visual media capture controller 110 keeps track of the current state of the visual representation.

Subsequent to the display unit 102 displaying the visual representation of the organizational structure, the visual media capture controller 110 identifies a predetermined haptic signal pattern indicating the desired categorization of the captured media 206. The touch controller 103 transmits haptic signals to the visual media capture controller 110, which recognizes the predetermined haptic signal pattern and transmits executable instructions to the processing unit 108 that cause the visual media library controller(s) 112 to store the organizational category to which the captured visual media should be assigned, new or pre-existing 208. The visual media library controller(s) 112 include(s) executable instructions executed by the processing unit 108 to store the organizational information in the memory/storage unit 104.

The foregoing embodiment relies upon evaluating haptic signals. Captured media is organized based upon recognizing a predetermined haptic signal pattern. A single tap on the visual representation of the desired organizational category or a visual representation of the desire to create a new category is sufficient to organize the captured visual media. Thus, visual media may be organized, including creation of new categories, at the time of capture with less effort than methods known in the art. This also allows for more precise organization based upon fleeting thoughts, ideas and emotions that exist at the time of capture and enhances the ability to use the device for visual thinking, which are creative uses of visual media capture devices for which the devices previously known in the art have not been optimized.

In alternate embodiments the predetermined haptic signal pattern may result from two taps, a long press, a pinch, or other predetermined haptic signal patterns. Such predetermined haptic signal patterns allow organizing visual media at the time of capture with all of the advantages of the previously described embodiments over the prior art. An advantage of using a predetermined haptic signal pattern other than a single tap is that it would avoid overt mimicry of the single tap design, while maintaining the advantages of the single tap design.

In another embodiment the displayed representation of organizational structure and a representation of the option to create a new organizational structure may be actively bypassed by recognizing a predetermined haptic signal pattern indicating that no categorization is desired. This is functionally equivalent to selecting an option to organize the visual media into a default/catch-all category, with all of the advantages of the previously described embodiments over the prior art. An additional advantage of this embodiment is that it can reduce the cognitive load on the user when desired by allowing the user to skip thinking about which category to select.

In another embodiment the organizational visual media capture device may conduct a visual media capture as a subcomponent of a larger process, such as, for example, creating a social media post. In such a case, the displayed representation of organizational structure and a representation of the option to create a new organizational structure may be passively bypassed without any user interaction with the organizational options by recognizing a predetermined haptic signal pattern indicating that the larger process should proceed and/or terminate such as, for example, a single tap on a button to finalize the social media post. This is functionally equivalent to selecting an option to organize the visual media into a default/catch-all category. This embodiment has all of the advantages of the previously described embodiments over the prior art. An additional advantage of this embodiment utilizing a visual media capture as a subcomponent of a larger process is that it offers the user a more complete experience for performing specific tasks, saving the user time and effort.

In alternate embodiments some or all of the memory/storage may not be a part of the memory/storage unit 104 and may be connected via a wireless data connection such as Wi-Fi, cellular data, Bluetooth, etc. For example, where the organizational visual media capture is for the purpose of creating a social media post, the captured media may be stored at a remote location controlled by the social media company. Various combinations of storage contained within the device and storage not contained within the device are possible, each with all of the advantages of the previously described embodiments over the prior art.

Similarly, in alternate embodiments some or all of the processing may not be performed by the processing unit 108 and may be connected via a wireless data connection such as Wi-Fi, cellular data, Bluetooth, etc. Colloquially, arrangements where some or all of the processing or memory/storage are not a part of the device are called "cloud" arrangements, each of which maintains all of the advantages of the previously described embodiments over the prior art. Advantages of a cloud arrangement include the ability to offer a more portable device than a comparable device not utilizing a cloud arrangement and other advantages known in the art.

Figure 4:
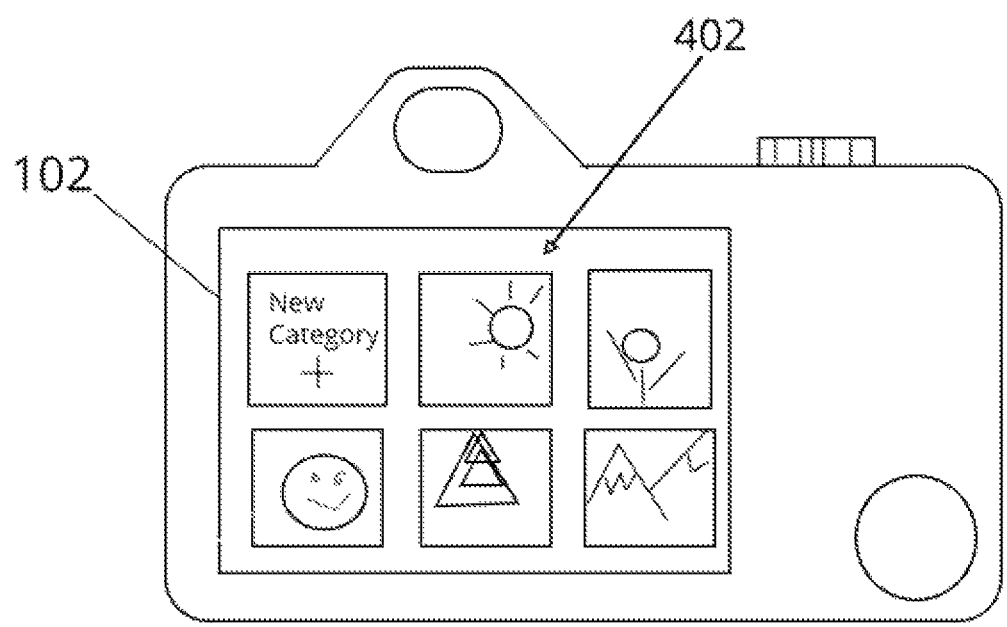
FIG. 4 illustrates the exterior of an electronic device implementing organizational visual media capture in accordance with the invention.

In alternate embodiments the visual representation of the organizational structure and the option to create a new organizational category may be presented in various dimensions and structures. For example, the categories and the option to create a new category may be presented as flat tiles 402 as shown in FIG. 4 or as segments of some or all of a disk or annulus (not illustrated) on the visual media capture device. Such variations in the visual representation of the organizational structure and the option to create a new organizational category maintain the advantages of the previously described embodiments over the prior art, aside from those specific to embodiments where the visual representation is a two dimensional projection of a three dimensional carousel. Advantages of certain embodiments using visual representations other than the carousel include a lower processing overhead for devices with less computational power, a visual appearance more in line with trends toward flat design, and other advantages known in the art.

In an alternate embodiment, immediately after a visual capture the visual media capture controller 110 displays the visual representation of the organizational structure and the option to create a new organizational category. Such an embodiment does not present the user with a preview of the captured media immediately after capture (as illustrated in FIG. 2). An alternate embodiment displays a visual representation of the organizational structure and the option to create a new category simultaneously with a preview of the capture media. Said embodiments have all of the advantages of the previously described embodiments over the prior art, with the additional advantage of enabling faster visual media captures.

In an alternate embodiment, the visual capture controller 110 can change behavior between that of a visual capture controller known previously in the art or that of a visual capture controller implementing operations of the invention via a user setting. Said embodiment has all of the advantages of the previously described embodiments over the prior art, with the additional advantage of providing users the option to use alternative capture designs as desired.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; SD cards; flash cards; and hardware devices that are specially configured to store and execute program code, such as application-specific integrated circuits ("ASICs"), programmable logic devices ("PLDs") and ROM and RAM devices.

Examples of computer code include machine code, such as produced by a compiler, and files containing higher-level code that are executed by a computer using an interpreter. For example, an embodiment of the invention may be implemented using JAVA®, C++, Objective C or other programming languages and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An electronic device, comprising:
    digital image sensors to capture visual media;
    a display to present a visual representation of existing organizational categories and the option to create a new category;
    a touch controller to identify haptic contact engagement, haptic contact position and haptic contact release on the display; and
    a visual media capture controller to update the display upon capture of visual media with a visual representation of existing organizational categories and the option to create a new category; organize said visual media into a new category by identification of a predetermined number of haptic contact signals of predetermined type, generation of organizational information based upon information generated by said touch controller regarding the predetermined number of haptic contact signals of predetermined type, and recordation of said organizational information; organize said visual media into existing categories by identification of a predetermined number of haptic contact signals of predetermined type, generation of organizational information based upon information generated by said touch controller regarding the predetermined number of haptic contact signals of predetermined type, and recordation of said organizational information; and update the display to remove said visual representation of existing organizational categories and the option to create a new category.

2. The electronic device of claim 1 wherein the visual media capture controller presents a two-dimensional representation of a three-dimensional carousel with simulated axis of rotation parallel to the longer side of the device as a visual representation of existing organizational categories and the option to create a new organizational on the display, whereby said carousel provides ergonomic advantage to a natural hand grip of the device by allowing simulated rotation of the carousel with a thumb motion corresponding to the range of motion of the thumb and reduces the jarring visual transition between the three-dimensional subject matter of the captured visual media and the visual representation of existing organizational categories and the option to create a new category.

3. The electronic device of claim 1 wherein the predetermined number of haptic contact signals of predetermined type identified by the visual media capture controller correspond to one or more haptic contact signals generated by a single tap upon the display.

4. The electronic device of claim 2 wherein the predetermined number of haptic contact signals of predetermined type identified by the visual media capture controller correspond to one or more haptic contact signals generated by a single tap upon the display.

5. The electronic device of claim 1 wherein the visual media capture controller invokes a visual media preview mode.

6. The electronic device of claim 1 wherein the visual media capture controller records the captured visual media and organizational information in a visual media library.

7. The electronic device of claim 1 wherein the visual media capture controller invokes a visual media preview mode simultaneously with presentation of the visual representation of existing categories and the option to create a new category.

8. The electronic device of claim 1 wherein the visual media capture controller additionally can organize visual media captured by the digital image sensors into no category by identification of a predetermined number of haptic contact signals of predetermined type.

9. The electronic device of claim 6 wherein the predetermined number of haptic contact signals of predetermined type correspond to one or more haptic contact signals generated by a single tap upon the display.

10. The electronic device of claim 2 wherein the predetermined number of haptic contact signals of predetermined type identified by the visual media capture controller correspond to one or more haptic contact signals generated by a single tap upon the display and wherein the visual media capture controller invokes a visual media preview mode.

11. A non-transitory computer readable storage medium, comprising executable instructions to:
    capture and record visual media;
    update the display upon capture of said visual media with a visual representation of existing organizational categories and the option to create a new category;
    process haptic contact signals from a display;
    generate organizational information corresponding to a new category for said visual media based upon information resulting from processing a predetermined number of haptic contact signals of predetermined type;
    generate organizational information corresponding to existing categories for said visual media based upon information resulting from processing a predetermined number of haptic contact signals of predetermined type;
    record said organizational information; and
    update the display to remove said visual representation of existing organizational categories and the option to create a new category.

12. The non-transitory computer readable storage medium of claim 11 wherein the executable instructions to display the visual representation of existing organizational categories and the option to create a new category include instructions to render the visual representation as a two-dimensional representation of a three-dimensional carousel with simulated axis of rotation parallel to the longer side of the device, whereby said carousel provides ergonomic advantage to a natural hand grip of the device by allowing simulated rotation of the carousel with a thumb motion corresponding to the range of motion of the thumb and reduces the jarring visual transition between the three-dimensional subject matter of the captured visual media and the visual representation of existing organizational categories and the option to create a new category.

13. The non-transitory computer readable storage medium of claim 11 wherein the predetermined number of haptic contact signals of predetermined type processed to generate organizational information correspond to one or more haptic contact signals generated by a single tap upon the display.

14. The non-transitory computer readable storage medium of claim 12 wherein the predetermined number of haptic contact signals of predetermined type processed to generate organizational information correspond to one or more haptic contact signals generated by a single tap upon the display.

15. The non-transitory computer readable storage medium of claim 11 wherein the visual media capture controller invokes a visual media preview mode.

16. The non-transitory computer readable storage medium of claim 15 wherein the predetermined number of haptic contact signals of predetermined type identified by the visual media capture controller correspond to one or more haptic contact signals generated by a single tap upon the display.

17. The non-transitory computer readable storage medium of claim 11 further including executable instructions to invoke a visual media preview mode simultaneously with presentation of the visual representation of existing categories and the option to create a new category.

18. The non-transitory computer readable storage medium of claim 11 further including executable instructions to generate organizational information corresponding to no category based upon information resulting from processing a predetermined number of haptic contact signals of predetermined type.

19. The non-transitory computer readable storage medium of claim 16 wherein the predetermined number of haptic contact signals of predetermined type correspond to one or more haptic contact signals generated by a single tap upon the display.

20. The non-transitory computer readable storage medium of claim 12 wherein the predetermined number of haptic contact signals of predetermined type correspond to one or more haptic contact signals generated by a single tap upon the display and further including executable instructions to invoke a visual media preview mode.

* * * * *